(12) United States Patent
Fujita et al.

(10) Patent No.: US 11,628,835 B2
(45) Date of Patent: Apr. 18, 2023

(54) VEHICLE CONTROL SYSTEM

(71) Applicant: Toyota Jidosha Kabushiki Kaisha, Toyota (JP)

(72) Inventors: Kazuyuki Fujita, Gotemba (JP); Yoshinori Watanabe, Isehara (JP); Takayuki Goto, Yokohama (JP); Masahiro Harada, Hadano (JP); Nobuhide Kamata, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 214 days.

(21) Appl. No.: 17/069,018

(22) Filed: Oct. 13, 2020

(65) Prior Publication Data

US 2021/0107528 A1    Apr. 15, 2021

(30) Foreign Application Priority Data

Oct. 15, 2019   (JP) ............... JP2019-188901

(51) Int. Cl.
*B60W 30/095*  (2012.01)
*B60W 60/00*  (2020.01)
(Continued)

(52) U.S. Cl.
CPC ........ *B60W 30/0956* (2013.01); *B60W 30/09* (2013.01); *B60W 40/04* (2013.01); *B60W 60/0011* (2020.02); *B60W 60/0016* (2020.02); *B60W 60/0051* (2020.02); *B60W 60/0059* (2020.02); *B60W 60/00272* (2020.02); *G06V 20/58* (2022.01); *B60W 2554/80* (2020.02);
(Continued)

(58) Field of Classification Search
None
See application file for complete search history.

(56) References Cited

U.S. PATENT DOCUMENTS

2005/0280520 A1   12/2005   Kubo
2015/0066348 A1    3/2015   Baba
(Continued)

FOREIGN PATENT DOCUMENTS

JP   2006-001369 A   1/2006
JP   2014-106854 A   6/2014
(Continued)

*Primary Examiner* — James J Lee
*Assistant Examiner* — Andrew Sang Kim
(74) *Attorney, Agent, or Firm* — Dinsmore & Shohl LLP

(57) ABSTRACT

A vehicle control system includes a first unit configured to generate a target trajectory based on a travel plan of the vehicle, and a second unit configured to execute vehicle travel control such that the vehicle follows the target trajectory. During the automated driving, the first unit transmits automated driving information to the second unit. The system includes a memory device in which driving environment information is stored, and a processor for controlling a travel control amount. During the automated driving, the processor executes preventive safety control for intervening in the travel control amount so as to prevent or avoid a collision between the vehicle and an obstacle based on the driving environment information. In the preventive safety control, the processor changes an intervention degree to the travel control amount based on the automated driving information.

1 Claim, 12 Drawing Sheets

(51) Int. Cl.
*B60W 40/04* (2006.01)
*B60W 30/09* (2012.01)
*G06V 20/58* (2022.01)
*G06V 20/56* (2022.01)

(52) U.S. Cl.
CPC ......... *B60W 2556/45* (2020.02); *G06V 20/56* (2022.01)

(56) References Cited

U.S. PATENT DOCUMENTS

| | | | |
|---|---|---|---|
| 2018/0265084 A1 | 9/2018 | Inou et al. | |
| 2018/0281791 A1 | 10/2018 | Fukaya et al. | |
| 2019/0079513 A1* | 3/2019 | Greenfield | G06F 11/2041 |
| 2019/0317520 A1* | 10/2019 | Zhang | G05D 1/0088 |
| 2020/0031335 A1 | 1/2020 | Ohmura | |
| 2020/0406907 A1* | 12/2020 | Omari | G07C 5/008 |

FOREIGN PATENT DOCUMENTS

| | | |
|---|---|---|
| JP | 2015-046132 A | 3/2015 |
| JP | 2017-102827 A | 6/2017 |
| JP | 2018-165085 A | 10/2018 |
| JP | 2018-181209 A | 11/2018 |
| JP | 2019-142246 A | 8/2019 |

* cited by examiner

VEHICLE CONTROL SYSTEM

CROSS-REFERENCE TO RELATED APPLICATION

The present application is based on, and claims priority from, Japanese Patent Application Serial Number 2019-188901, filed Oct. 15, 2019, the disclosure of which is hereby incorporated by reference herein in its entirety.

BACKGROUND

Field

The present disclosure relates to a vehicle control system that controls a vehicle performing automated driving.

Background

JP 2014-106854A discloses a technique related to an automated driving control device for performing automated driving of a vehicle. In this technique, it is determined whether a condition for performing automated driving is satisfied based on the detection accuracy of detection means for acquiring at least one of a travel state of the vehicle, a peripheral state of the vehicle, and a state of a driver. When it is determined that the condition for performing the automated driving is not satisfied, control is performed such as to notify the driver to cancel the automated driving.

JP 2006-1369A discloses a technique related to a Pre-Crash Safety system (PCS). The pre-crash safety system of this technique realizes the function of judging the situation of the own vehicle in which a collision is unavoidable in advance and activating safety equipment early to reduce the collision damage.

SUMMARY

During automated driving of a vehicle, a target trajectory is generated by an automated driving system that manages automated driving. The vehicle performs vehicle travel control that controls steering, acceleration and deceleration to follow the generated target trajectory.

Here, as in the above pre-crash safety system, consider a case where the preventive safety control to perform the intervention to the control amount of the vehicle travel control by determining the driving environment around the vehicle in advance is performed during the automated driving of the vehicle. The safety criteria for determining an intervention degree of the preventive safety control do not necessarily coincide with the safety criteria for the automated driving system to generate the target trajectory. For this reason, depending on the situation during the automated driving, excessive intervention of preventive safety control may cause a sense of discomfort or anxiety of the passenger or the surrounding people. Thus, there remains room for further optimization of the preventive safety control during the automated driving.

The present disclosure has been made in view of the above-mentioned problems, and an object thereof is to provide a vehicle control system capable of optimizing preventive safety control during automated driving of a vehicle.

In order to solve the above problems, it is applied to a vehicle control system that controls a vehicle capable of performing automated driving. The vehicle control system includes a first unit configured to generate a target trajectory based on a travel plan of the vehicle, and a second unit configured to execute vehicle travel control that controls steering, acceleration, and deceleration of the vehicle such that the vehicle follows the target trajectory. During the automated driving, the first unit is configured to transmit automated driving information related to the automated driving to the second unit. The second unit includes a controller. The controller includes a memory device in which driving environment information indicating a driving environment around the vehicle is stored, and a processor for controlling a travel control amount which is a control amount of the vehicle travel control. During the automated driving, the controller is configured to execute preventive safety control for intervening in the travel control amount so as to prevent or avoid a collision between the vehicle and an obstacle based on the driving environment information. In the preventive safety control, the controller is configured to change an intervention degree to the travel control amount based on the automated driving information.

The second disclosure has the following further features in the first disclosure.

The automated driving information includes the target trajectory. The controller is configured to change the intervention degree of the preventive safety control based on the target trajectory.

The third disclosure has the following further features in the first disclosure.

The automated driving information includes a reliability of the first unit. The controller is configured to change an intervention degree of the preventive safety control based on the reliability.

The fourth disclosure has the following further features in the first disclosure.

The automated driving information includes a failure degree of the first unit. The controller is configured to increase the intervention degree of the preventive safety control as the failure degree is higher.

The fifth disclosure has the following further features in the first disclosure.

The automated driving information includes risk information that the first unit grasps. The controller is configured to change the intervention degree based on the risk information.

The sixth disclosure has the following further features in the first disclosure.

The preventive safety control is configured to detect an avoidance target having a possibility of collision with the vehicle based on the driving environment information, and modify the travel control amount so as to avoid the avoidance target when a predetermined operating condition for the avoidance target is satisfied.

According to the vehicle control system of the present disclosure, the second unit can grasp the automated driving information of the first unit. The automated driving information can be a useful indicator in determining the intervention degree of the preventive safety control. Therefore, according to the present disclosure, the second unit can determine the intervention degree of the preventive safety control in consideration of the automated driving information of the first unit. This makes it possible to suppress unnecessary intervention in the preventive safety control and ensure high safety.

BRIEF DESCRIPTION OF DRAWINGS

FIG. 4 is a diagram showing a situation in which the vehicle M1 is laterally moved to a shoulder for unloading, getting on and off of passengers, and the like;

DETAILED DESCRIPTION

Hereinafter, an embodiment of the present disclosure will be described with reference to the accompanying drawings. However, it is to be understood that even when the number, quantity, amount, range or other numerical attribute of each element is mentioned in the following description of the embodiment, the present disclosure is not limited to the mentioned numerical attribute unless explicitly described otherwise, or unless the present disclosure is explicitly specified by the numerical attribute theoretically. Furthermore, structures or steps or the like that are described in conjunction with the following embodiment is not necessarily essential to the present disclosure unless explicitly described otherwise, or unless the present disclosure is explicitly specified by the structures, steps or the like theoretically.

Figure 1:
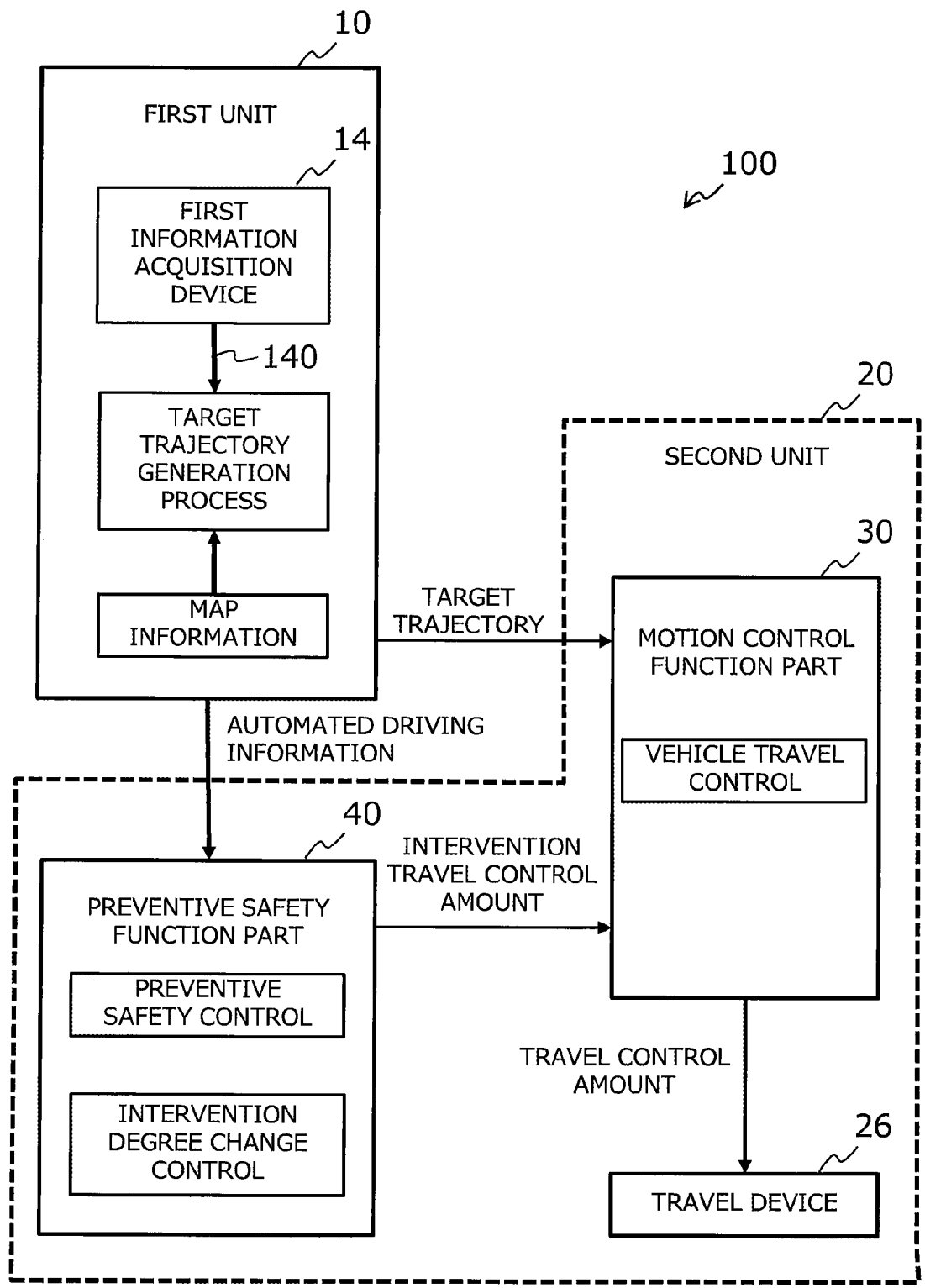
FIG. 1 is a block diagram showing a configuration example for explaining an outline of the vehicle control system according to first embodiment.

1. First Embodiment 1-1. Overall Configuration of Vehicle Control System of First Embodiment First, a schematic configuration of a vehicle control system according to the present embodiment will be described. FIG. 1 is a block diagram showing a configuration example for explaining an outline of the vehicle control system according to the first embodiment. A vehicle control system 100 shown in FIG. 1 is mounted on a vehicle. Hereinafter, the vehicle in which the vehicle control system 100 is mounted is also referred to as a vehicle M1. The vehicle M1 is an automated driving vehicle capable of automated driving. As the automated driving in this case, automated driving of level 3 or higher in the level definition of SAE (Society of Automotive Engineers) is assumed. A power source of the vehicle M1 is not limited.

The vehicle control system 100 controls the vehicle M1. Alternatively, at least a portion of the vehicle control system 100 may be located on an external device external to the vehicle and remotely control the vehicle. That is, the vehicle control system 100 may be distributed to the vehicle M1 and the external device.

As shown in FIG. 1, the vehicle control system 100 is configured to include a first unit 10 and a second unit 20. The first unit 10 is an automated driving system for managing the automated driving of the vehicle M1. The second unit 20 is a vehicle traveling system for performing a vehicle traveling control of the vehicle M1. The first unit 10 and the second unit 20 may be physically separate devices or may be the same device. If the first unit 10 and the second unit 20 are physically separate devices, they exchange necessary information via communications. The functions of these systems will be described below.

The first unit 10 includes a first information acquisition device 14. The first information acquisition device 14 acquires various information using sensors mounted on the vehicle M1. Information acquired by the sensors mounted on the vehicle M1 is information indicating a driving environment of the vehicle M1. In the following description, this information is referred to as "driving environment information 140". The driving environment information 140 includes vehicle position information indicating a position of the vehicle M1, vehicle state information indicating a state of the vehicle M1, surrounding situation information indicating a surrounding situation of the vehicle M1, driver information indicating a state of a driver of the vehicle M1, and the like.

The first unit 10 has a function for executing a target trajectory generation process. In the target trajectory generation process, map information is used. The map information includes various information associated with the position. The map information is not limited to general road maps and navigation maps, and may include map information of various viewpoints. For example, the map information may include the position of a stationary object on a road, such as a guardrail, or a wall, a road surface, a white line, a pole, or a characteristic object such as a signboard.

The first unit 10 generates a travel plan of the vehicle M1 during the automated driving, based on the map information and the driving environment information 140. The travel plan includes maintaining a current travel lane, making a lane change, avoiding obstacles, overtaking a preceding vehicle, stopping by shifting to a road shoulder, and so forth. Then, the first unit 10 generates the target trajectory required for the vehicle M1 to travel in accordance with the travel plan.

Here, the target trajectory includes a set of target positions [Xi, Yi] of the vehicle M1 in a road on which the vehicle M1 travels. Incidentally, an X-direction is a forward direction of the vehicle M1, and a Y-direction is a plane direction orthogonal to the X-direction. The target trajectory may further include a target velocity [VXi, VYi] for each target position [Xi, Yi]. The first unit 10 outputs the generated target trajectory to the second unit 20.

The second unit 20 includes a motion control function part 30 for performing vehicle travel control of the vehicle M1. In the vehicle travel control, the motion control function part 30 controls the control amount related to steering, acceleration, and deceleration of the vehicle M1. Their control amounts are hereinafter referred to as "travel control amount". During the automated driving of the vehicle M1, the motion control function part 30 of the second unit 20 receives the target trajectory from the first unit 10. Basically, the motion control function part 30 controls the travel control amount of the vehicle M1 so that the vehicle M1 follows the target trajectory. Typically, the motion control function part 30 calculates the deviation between various state quantities of the vehicle M1 and the target trajectory (e.g., lateral deviation, yaw angle deviation, velocity deviation, and so forth). Then, the motion control function part 30 calculates the travel control amount such that the deviation decreases.

The calculated travel control amount is output to a travel device 26. The travel device 26 includes a device for driving, braking, and turning the vehicle M1. The travel device 26 controls the traveling of the vehicle M1 based on the input travel control amount.

The second unit 20 further includes a preventive safety function part 40 for performing preventive safety control of the vehicle M1. In the preventive safety control, the preventive safety function part 40 intervenes in the vehicle control amount of the vehicle M1 for the purpose of preventing, avoiding, or reducing the collision between the vehicle M1 and obstacles. As such preventive safety control, for example, a Pre-Crash Safety (PCS) control is exemplified. The pre-crash safety control supports the avoidance of collision between the vehicle M1 and a surrounding object to be avoided (namely, an avoidance target). The preventive safety control also includes risk avoidance control for controlling the vehicle control amount of the vehicle M1 at a timing faster than the Pre-Crash Safety (PCS) control in preparation for a possible risk in the future.

Figure 2:
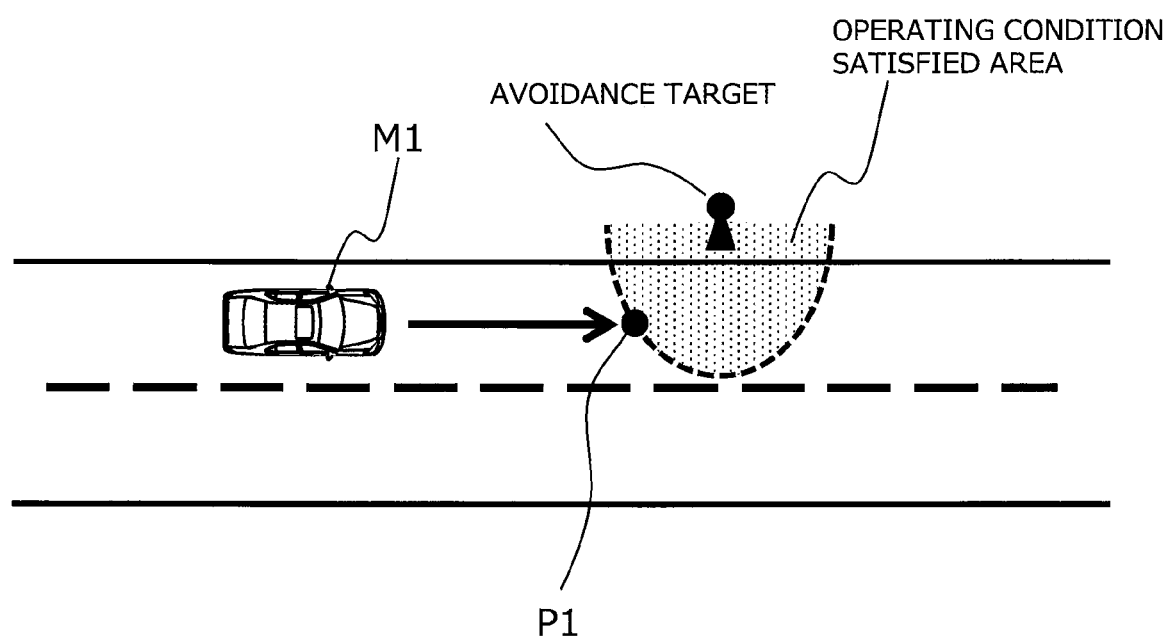
FIG. 2 is a diagram schematically showing an example of an operating condition satisfied area.

In the pre-crash safety control, the preventive safety function part 40, based on the driving environment information indicating the driving environment of the vehicle M1, determines whether an operating condition of the pre-crash safety control is satisfied. Here, for example, the operating condition is that a TTC (Time To Collision) from the vehicle M1 to the avoidance target is smaller than a predetermined threshold value. FIG. 2 is a diagram schematically showing an example of an operating condition satisfied area. In the example shown in FIG. 2, when the vehicle M1 enters an operating condition satisfied area at the position P1, the preventive safety function part 40 calculates a travel control amount for avoiding a collision to the avoidance target. The travel control amount calculated by the preventive safety function part 40 is hereinafter referred to as an "intervention travel control amount". The calculated intervention travel control amount is output to the motion control function part 30.

Basically, the motion control function part 30 calculates the travel control amount of the vehicle M1 so that the vehicle M1 follows the target trajectory. However, when the intervention travel control amount is input from the preventive safety function part 40, the motion control function part 30 outputs the input intervention travel control amount to the travel device 26.

1-2. Features of Vehicle Control System of First Embodiment

Figure 3:
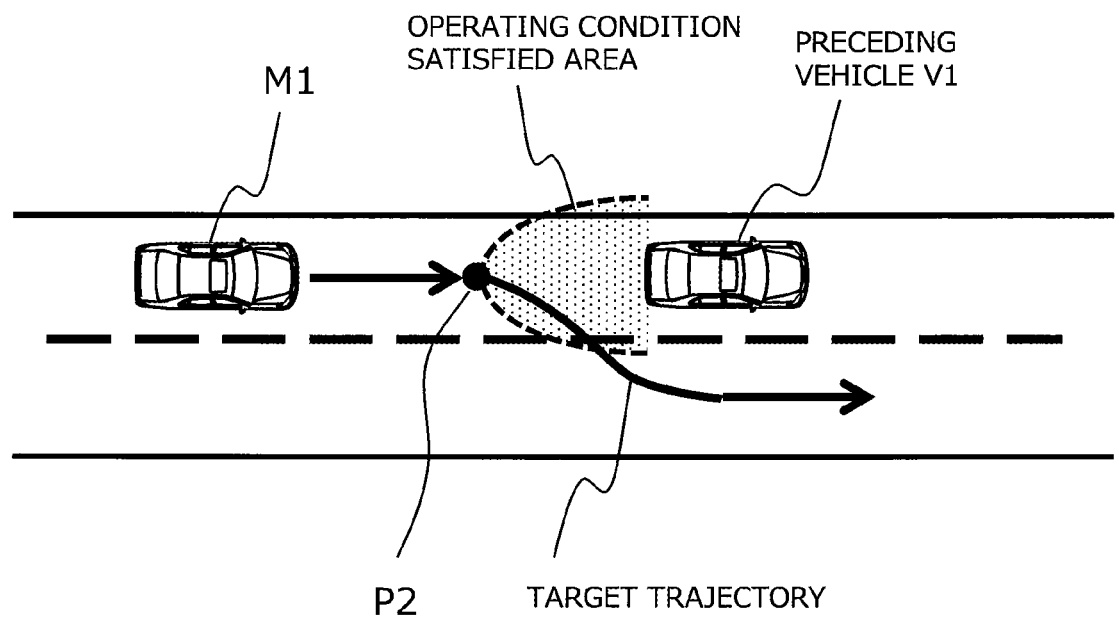
FIG. 3 is a diagram illustrating a situation in which a preceding vehicle V1 to be passed exists in front of a vehicle M1.

Next, the features of the vehicle control system of the present embodiment will be described. As an example, FIG. 3 shows a situation where a preceding vehicle V1 to be passed exists in front of a vehicle M1. The first unit 10 recognizes the preceding vehicle V1 as a vehicle to be passed and generates a target trajectory for safely passing the preceding vehicle V1 in accordance with the designed safety standards. On the other hand, the preventive safety function part 40 of the second unit 20 executes preventive safety control in accordance with a unique safety standard different from that of the first unit 10. Therefore, even if the first unit 10 correctly recognizes the preceding vehicle V1 and generates a target trajectory for safely passing the preceding vehicle V1, the preventive safety function part 40 may not recognize that the generated target trajectory is supposed to pass the preceding vehicle V1. In this case, when the vehicle M1 approaches the preceding vehicle V1, the preventive safety function part 40 determines that there is a possibility of collision with the preceding vehicle V1 at the position P2, and may execute preventive safety control.

Figure 4:
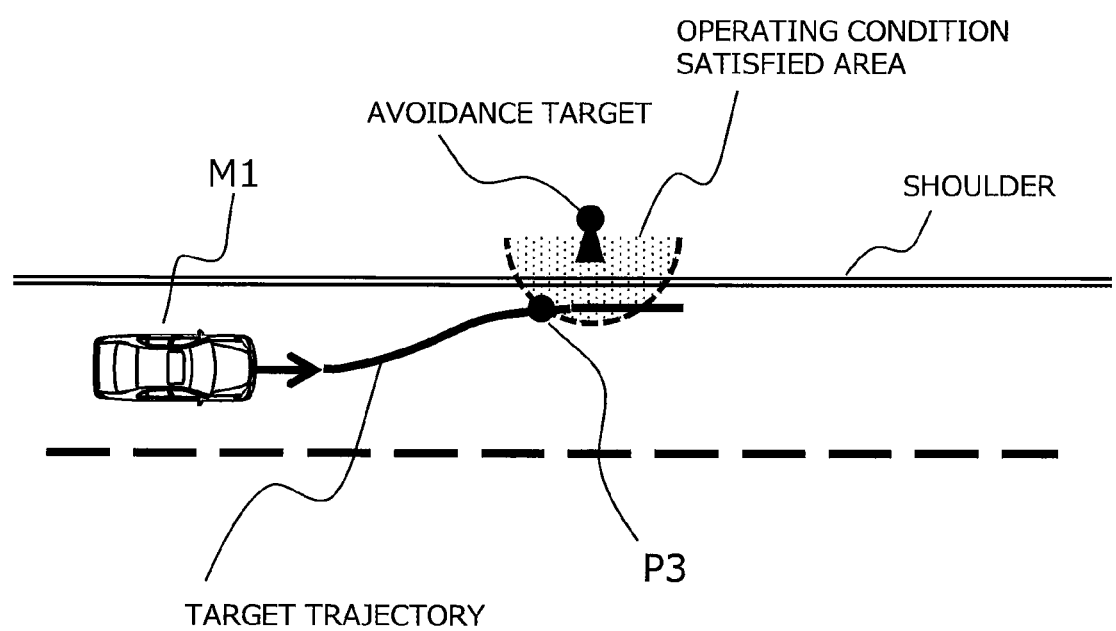

As another example, FIG. 4 shows a situation in which the vehicle M1 is moved to a shoulder for unloading, getting on and off passengers, and the like. The first unit 10 recognizes the vehicle M1 to the surrounding people and structures and generates a target trajectory for safely shifting the vehicle M1 to the shoulder in accordance with the designed safety standards. On the other hand, the preventive safety function part 40 of the second unit 20 executes preventive safety control according to a unique safety standard different from that of the first unit 10. Therefore, even if the first unit 10 correctly recognizes the surrounding person or structure and generates a target trajectory for safely aligning the vehicle M1 to the shoulder, the preventive safety function part 40 may not recognize that the generated target trajectory is supposed to align the vehicle M1 to the shoulder. In this case, the preventive safety function part 40 determines that there is a possibility of collision when the vehicle M1 approaches a person or a structure on the road side, and may execute preventive safety control.

In this manner, a situation in which the preventive safety function part 40 executes excessive preventive safety control while the target trajectory generated by the first unit 10 is appropriate is not appropriate. When such excessive preventive safety control is executed, there is a possibility that the occupant of the vehicle M1 and the surrounding people feel uncomfortable feeling or anxiety.

In the vehicle control system 100 of the present embodiment, information related to the automated driving managed by the first unit 10 is transmitted from the first unit 10 to the preventive safety function part 40 of the second unit 20. This information is hereinafter referred to as "automated driving information". In the present embodiment, the first unit 10 transmits the target trajectory generated by the first unit 10 as the automated driving information.

The preventive safety function part 40 of the second unit 20 changes an intervention degree of the preventive safety control based on the received automated driving information (target trajectory). The intervention degree is the intervention degree of the preventive safety control with respect to the travel control amount calculated based on the target trajectory. The intervention degree can be controlled by changing the operating condition of the preventive safety control (e.g., operating threshold, operation timing) and the amount of operation.

For example, when the target trajectory is a target trajectory for passing the preceding vehicle as shown in FIG. 3, the preventive safety function part 40 changes the operating condition so that the operation timing of the preventive safety control becomes later than the timing when the vehicle M1 crosses the lane.

When the target trajectory is, for example, a target trajectory for moving the vehicle to the shoulder as shown in FIG. 4, the preventive safety function part 40 changes the threshold of the TTC (Time To Collision) for the road side person or the structure so that the operation timing of the preventive safety control for the road side person or the structure is delayed.

As described above, the preventive safety function part 40 changes the operating condition so that the operation timing of the preventive safety control is delayed in a situation where it is possible to determine that the vehicle M1 is unlikely to collide with the object based on the target trajectory received from the first unit 10. This suppresses the execution of unnecessary preventive safety control, so that it is possible to suppress the sense of discomfort and anxiety of the occupants of the vehicle M1 and the surrounding people.

Hereinafter, the detailed configuration and operation of the vehicle control system 100 according to the present embodiment will be described in more detail.

1-3. Detailed Configuration Example of First Unit 10

Figure 5:
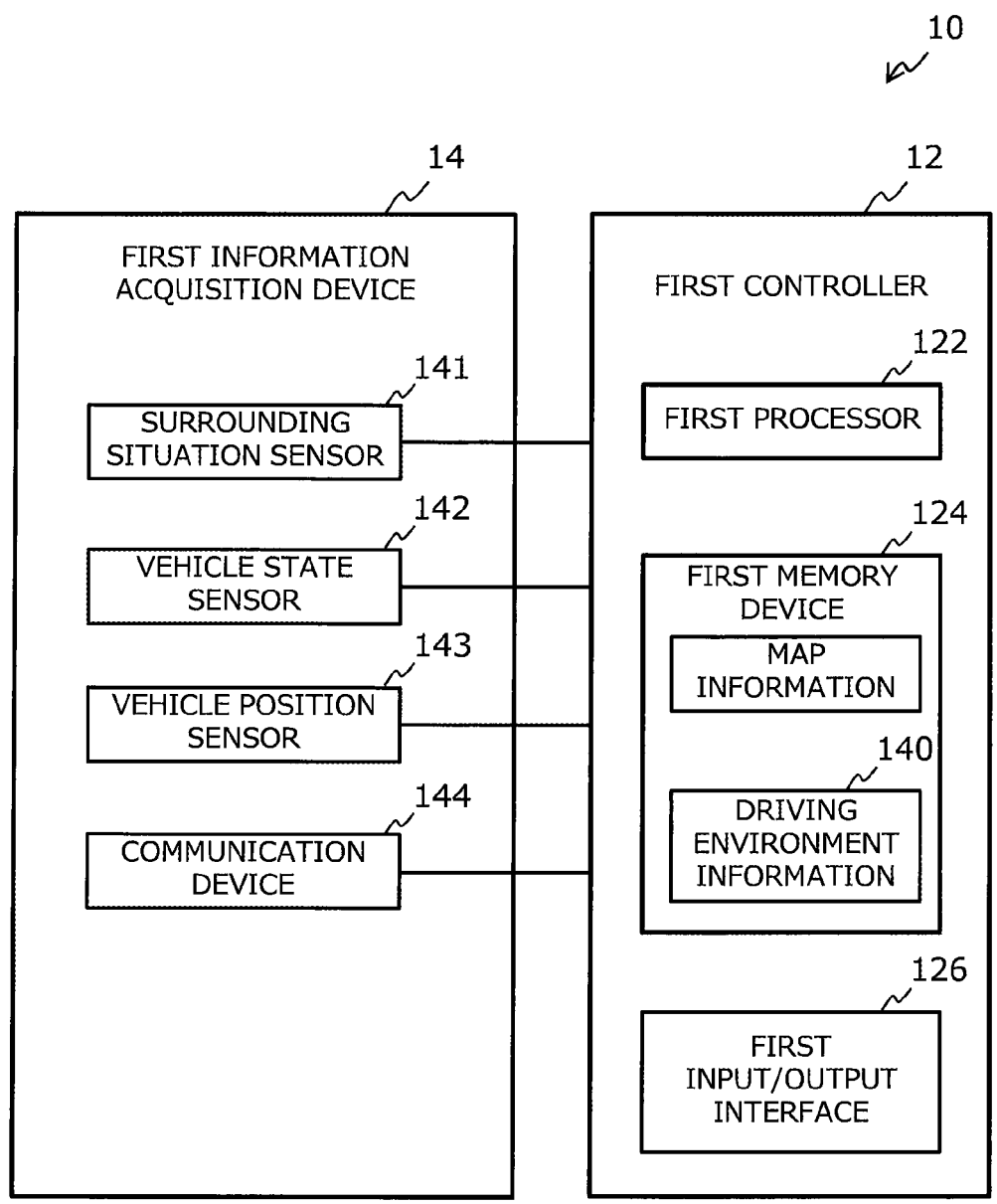
FIG. 5 is a block diagram showing a configuration example of a first unit according to the first embodiment.

FIG. 5 is a block diagram showing a configuration example of the first unit according to the present embodiment. As shown in FIG. 5, the first unit 10 includes a first controller 12 for managing the automated driving of the vehicle M1. Further, the first unit 10 includes a first information acquisition device 14 connected to the input side of the first controller 12.

The first information acquisition device 14 includes a surrounding situation sensor 141, a vehicle state sensor 142, a vehicle position sensor 143, and a communication device 144.

The surrounding situation sensor 141 recognizes surrounding situation information of the vehicle M1. For example, the surrounding situation sensor 141 is exemplified a camera (imaging device), a LIDAR: Laser Imaging Detection and Ranging, a radar, and so forth. The surrounding situation information includes target information about a target recognized by the surrounding situation sensor 141. The target is exemplified by a surrounding vehicle, a pedestrian, a roadside structure, an obstacle, a white line, a signal, and the like. The target information includes information on a relative position and a relative velocity of the target with respect to the vehicle M1. The surrounding situation information recognized by the surrounding situation sensor 141 is transmitted to the first controller 12 at any time.

The vehicle state sensor 142 detects vehicle information indicating a state of the vehicle M1. For example, the vehicle state sensor 142 includes a vehicle speed sensor, a lateral acceleration sensor, a yaw rate sensor, and the like. The vehicle information detected by the vehicle state sensor 142 is transmitted to the first controller 12 at any time.

The vehicle position sensor 143 detects a position and an orientation of the vehicle M1. For example, the vehicle position sensor 143 includes a GPS (Global Positioning System) sensor. The GPS sensor receives a signal transmitted from a plurality of GPS satellites, and calculates the position and the orientation of the vehicle M1 based on the received signal. The vehicle position sensor 143 may perform well-known self-position estimation process (localization) to increase accuracy of the present position of the vehicle M1. The vehicle information detected by the vehicle position sensor 143 is transmitted to the first controller 12 at any time.

The communication device 144 communicates with the outside of the vehicle. For example, the communication device 144 communicates with an external device outside of the vehicle M1 via a communication network. For example, the external device includes a roadside unit, a surrounding vehicle, a surrounding infrastructure, and the like. The roadside unit is a beacon device that transmits, for example, traffic jam information, traffic information by lane, restriction information such as pause, information on traffic conditions at blind spot positions, and the like. Further, when the external device is a surrounding vehicle, the communication device 144 performs vehicle to-to-vehicle communication (V2V communication) with the surrounding vehicle. Further, when the external device is a surrounding infrastructure, the communication device 144 performs vehicle-to-infrastructure communication (V2I communication) with the surrounding infrastructure.

The first controller 12 is an information processing device that perform various processes in the vehicle control system 100. More specifically, the first controller 12 is a microcomputer having a first processor 122, a first memory device 124, and a first input/output interface 126. The first controller 12 is also referred to as an Electronic Control Unit (ECU).

Various kinds of information are stored in the first memory device 124. For example, the driving environment information 140 acquired by the first information acquisition device 14 is stored in the first memory device 124. For example, the first memory device 124 includes a volatile memory, a non-volatile memory, and a hard disk drive (HDD).

The first memory device 124 stores map information including detailed road information. The map information includes, for example, information on a shape of a road, a number of lanes, a lane width, and the like. Alternatively, the map information may be stored in an external management server. In this case, the first controller 12 communicates with the management server to acquire necessary map information. The acquired map information is stored in the first memory device 124.

The first processor 122 executes automated driving software which is a computer program. The automated driving software is stored in the first memory device 124. Alternatively, the automated driving software is recorded on a computer-readable recording medium. The functions of the first controller 12 is realized by the first processor 122 executing the automated driving software.

The first controller 12 performs management of the automated driving of the vehicle M1. Typically, the first controller 12 performs a target trajectory generation process for generating a target trajectory for the automated driving of the vehicle M1.

The first input/output interface 126 is an interface for exchanging information with the second unit 20. The automated driving information and the target trajectory generated by the first controller 12 are output to the second unit 20 via the first input/output interface 126.

1-4. Target Trajectory Generation Process

Figure 6:
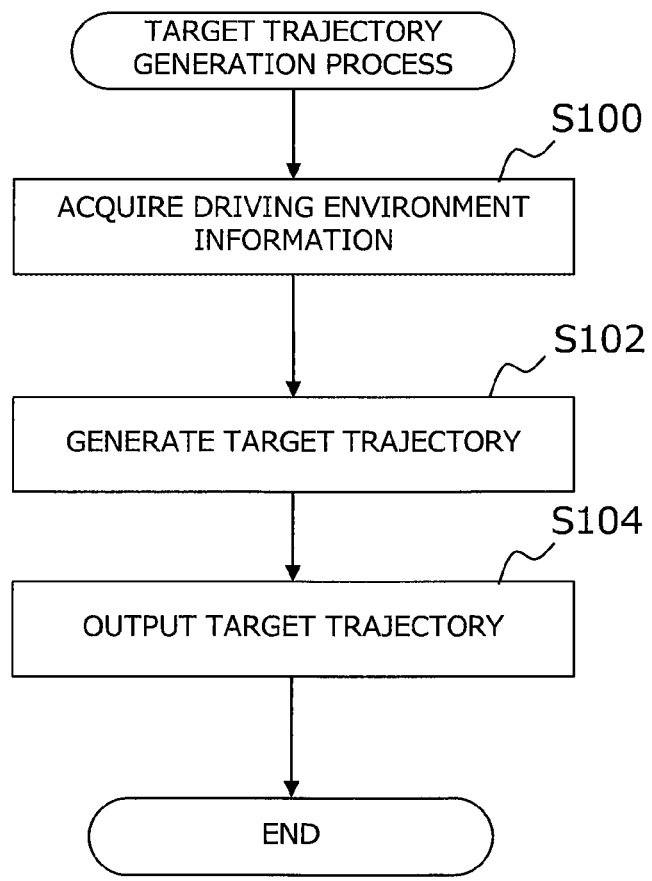
FIG. 6 is a flowchart showing a control routine of a target trajectory generation process executed in a first controller of the first unit according to the first embodiment.

FIG. 6 is a flowchart showing a control routine of a target trajectory generation process executed in the first controller of the first unit according to the present embodiment. The control routine shown in FIG. 6 is repeatedly executed at a predetermined control period during the automated driving of the vehicle M1.

In the control routine shown in FIG. 6, first in step S100, the first controller 12 acquires the driving environment information 140 from the first information acquisition device 14. The driving environment information 140 is stored in the first memory device 124.

Next in step S102, the first controller 12 generates a target trajectory for the automated driving of the vehicle M1 based on the map information and the driving environment information 140. More specifically, the first controller 12 generates a travel plan of the vehicle M1 during the automated driving, based on the map information and the driving environment information 140. The first controller 12 generates the target trajectory required for the vehicle M1 to travel according to the generated travel plan based on the driving environment information 140.

For example, the first controller 12 generates a target trajectory for the passing of a preceding vehicle. More specifically, the first controller 12 recognizes the preceding vehicle based on the surrounding situation information. Furthermore, the first controller 12 predicts the future position of each of the vehicle M1 and the preceding vehicle based on the vehicle state information and the surrounding situation information, and generates a target trajectory for the vehicle M1 to avoid and overtake the preceding vehicle.

As another example, the first controller 12 generates the target trajectory for moving the vehicle M1 to a shoulder. More specifically, the first controller 12 recognizes the road shoulder, which is a destination, and the surrounding people and structures of the shoulder, based on the map information, the vehicle position information, and the surrounding situation information. Then, the first controller 12 generates the target trajectory for the vehicle M1 to avoid the surrounding people and structures and to stop the shoulder based on the information.

The first controller 12 outputs the generated target trajectory to the second unit 20 via the first input/output interface 126 in step S104. Each time the target trajectory is updated, the latest target trajectory is output to the second unit 20.

1-5. Detailed Configuration Example of Second Unit 20

Figure 7:
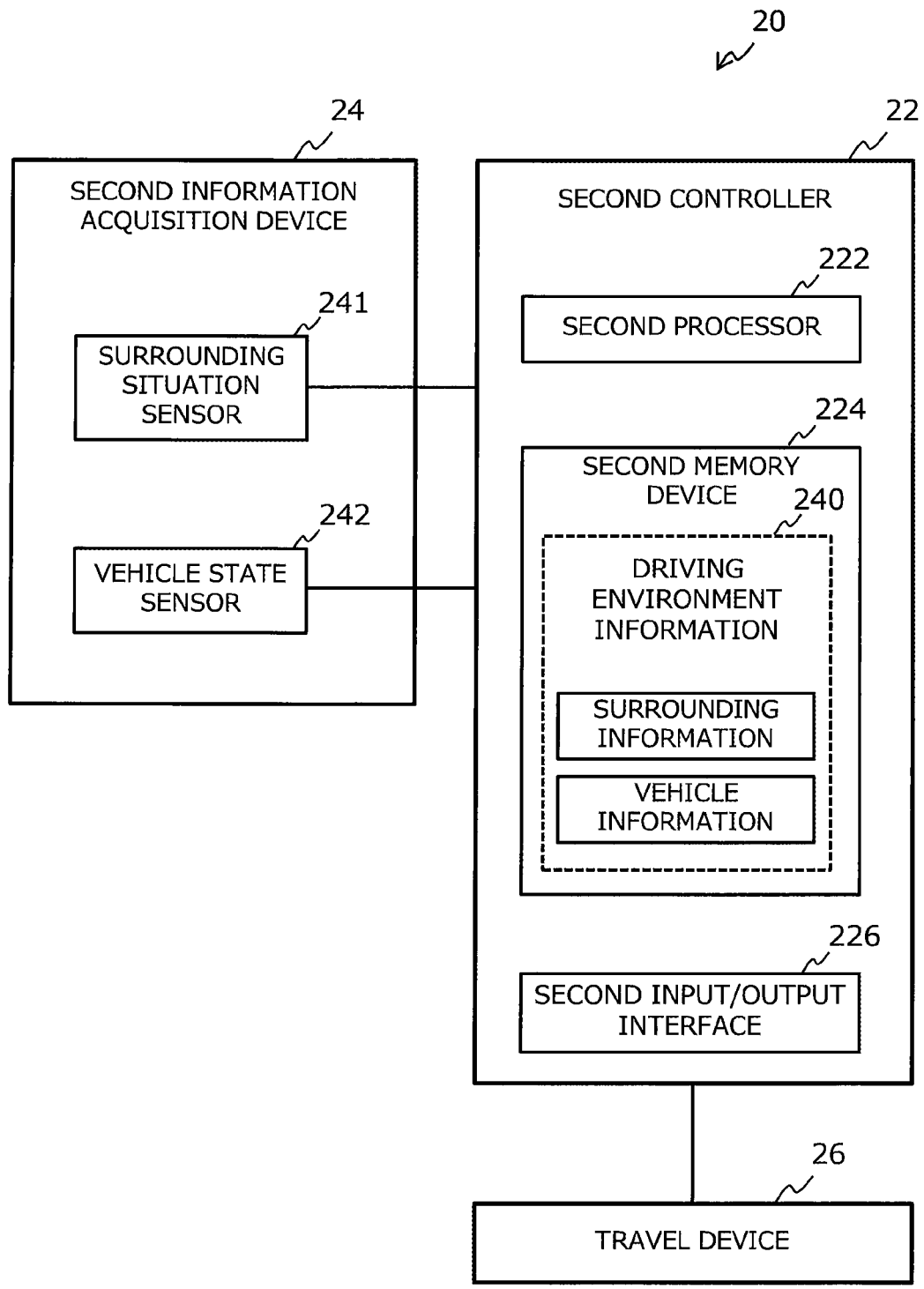
FIG. 7 is a block diagram showing a configuration example of a second unit according to the first embodiment.

FIG. 7 is a block diagram showing a configuration example of the second unit according to the present embodiment. As shown in FIG. 7, the second unit 20 includes a second controller 22, a second information acquisition device 24, and a travel device 26.

The second information acquisition device 24 includes a surrounding situation sensor 241 and a vehicle state sensor 242.

The surrounding situation sensor 241 recognizes surrounding situation information of the vehicle M1. For example, the surrounding situation sensor 241 is exemplified a camera (imaging device), a LIDAR: Laser Imaging Detection and Ranging, a radar, and so forth. The surrounding situation information includes target information about a target recognized by the surrounding situation sensor 241. The target is exemplified by a surrounding vehicle, a pedestrian, a roadside structure, an obstacle, a white line, a signal, and the like. The target information includes information on a relative position and a relative velocity of the target with respect to the vehicle M1. The surrounding situation information recognized by the surrounding situation sensor 241 is transmitted to the second controller 22 at any time.

The vehicle state sensor 242 detects vehicle information indicating a state of the vehicle M1. For example, the vehicle state sensor 242 includes a vehicle speed sensor, a lateral acceleration sensor, a yaw rate sensor, and the like. The vehicle information detected by the vehicle state sensor 242 is transmitted to the second controller 22 at any time. In the following description, the surrounding situation information and the vehicle information acquired by the second information acquisition device 24 are referred to as "driving environment information 240".

The first information acquisition device 14 and the second information acquisition device 24 may be partially shared. For example, the surrounding situation sensor 141 and the surrounding situation sensor 241 may be common. The vehicle state sensor 142 and the vehicle state sensor 242 may be common. That is, the first unit 10 and the second unit 20 may share a part of the first information acquisition device 14 or the second information acquisition device 24. In this case, the first unit 10 and the second unit 20 exchange necessary information with each other.

In addition to the surrounding situation sensor 241 and the vehicle state sensor 242, the second information acquisition device 24 may further include the same devices as the vehicle position sensor 143, or the communication device 144.

The travel device 26 includes a steering device, a driving device, and a braking device. The steering device turns wheels of the vehicle M1. The driving device is a power source that generates a driving force of the vehicle M1. The driving device is exemplified by an engine or an electric motor. The braking device generates a braking force of the vehicle M1.

The second controller 22 is an information processing device that perform various processes in the vehicle control system 100. More specifically, the second controller 22 is a microcomputer having a second processor 222, a second memory device 224, and a second input/output interface 226. The second controller 22 is also referred to as an Electronic Control Unit.

Various kinds of information are stored in the second memory device 224. For example, the second memory device 224 stores the surrounding situation information and the vehicle information (driving environment information 240) acquired by the second information acquisition device 24. For example, the second memory device 224 includes a volatile memory, a non-volatile memory, and a hard disk drive (HDD).

The second processor 222 executes vehicle travel control software which is a computer program. The vehicle travel control software is stored in the second memory device 224. Alternatively, the vehicle travel control software is recorded on a computer-readable recording medium. The function of the second controller 22 is realized by the second processor 222 executing the vehicle travel control software.

Specifically, the functions of the motion control function part 30 are realized by the second processor 222 executing the vehicle travel control software related to the vehicle travel control. In addition, the second processor 222 executes the vehicle travel control software related to the preventive safety control, thereby realizing the functions of the preventive safety function part 40. That is, the motion control function part 30 and the preventive safety function part 40 are incorporated in the second controller 22 as functions for performing the vehicle running control and the preventive safety control.

The motion control function part 30 and the preventive safety function part 40 may be incorporated in physically different controllers. In this case, the second unit 20 may be separately provided with a controller for the motion control function part 30 for performing vehicle travel control and a controller for the preventive safety function part 40 for performing preventive safety control.

The second input/output interface 226 is an interface for exchanging information with the first unit 10. The target trajectory and the automated driving information output from the first controller 12 are input to the second unit 20 via the second input/output interface 226.

1-6. Vehicle Travel Control

The second controller 22 executes the "vehicle travel control" that control the steering, the acceleration, and the deceleration of the vehicle M1. The second controller 22 executes the vehicle travel control by controlling an operation of the travel device 26. Specifically, the second controller 22 controls the steering of the vehicle M1 by controlling an operation of the steering device. The second controller 22 also controls the acceleration of the vehicle M1 by controlling an operation of the driving device. The second controller 22 controls the deceleration of the vehicle M1 by controlling an operation of the braking device.

In the vehicle travel control, the second controller 22 receives the target trajectory from the first unit 10 during the automated driving of the vehicle M1. Basically, the second controller 22 controls the travel control amount of the vehicle M1 such that the vehicle M1 follows the target trajectory. Typically, the motion control function part 30 calculates a deviation between various state quantities of the vehicle M1 and the target trajectory (e.g., lateral deviation, yaw angle sensor, speed deviation, etc.). Then, the motion control function part 30 executes the vehicle running control such that the deviation decreases.

1-7. Preventive Safety Control

Figure 8:
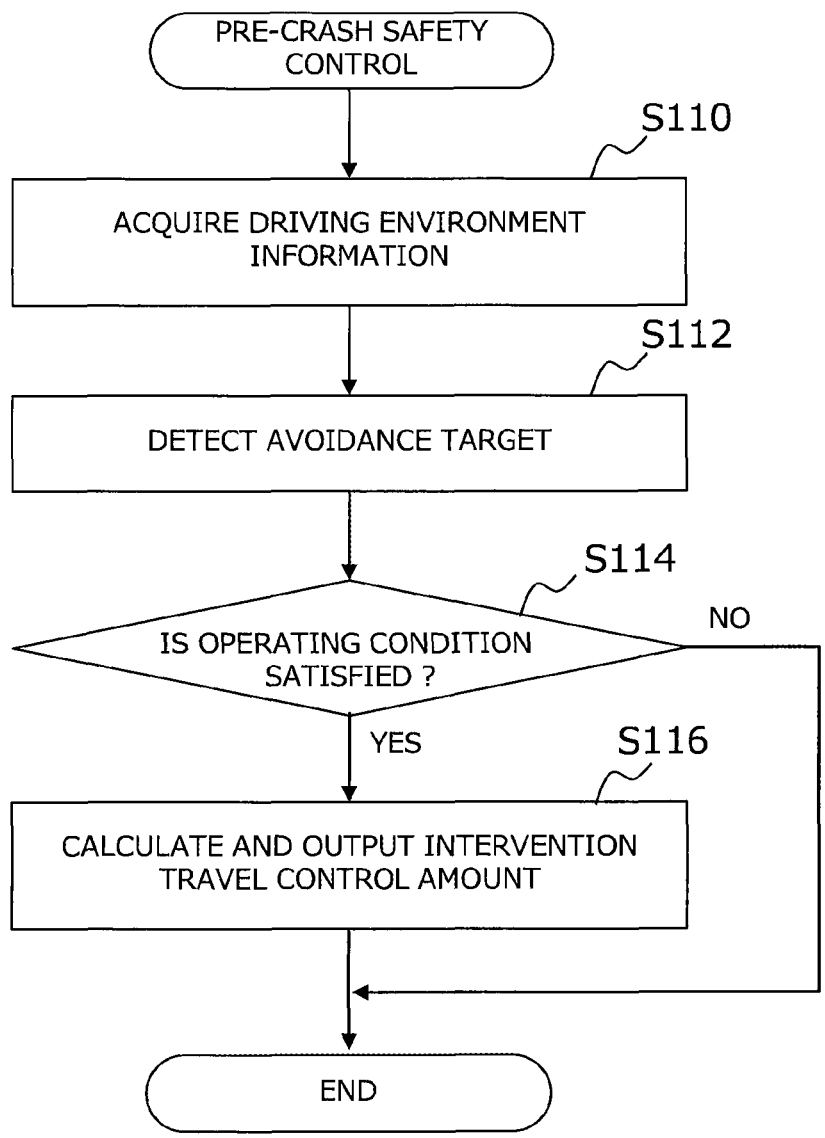
FIG. 8 is a flowchart showing a routine of processing relating to a pre-crash safety control executed in the second controller.

The second controller 22 performs preventive safety control to intervene in the travel control amount of the vehicle travel control for the purpose of improving the safety of the vehicle M1. Typically, the second controller 22 executes a pre-crash safety control to avoid a collision to the collision object of the vehicle M1 during the automated driving of the vehicle M1. FIG. 8 is a flowchart showing a routine of processing relating to the pre-crash safety control executed by the second controller 22. The second controller 22 repeatedly executes the routine shown in FIG. 8 at a predetermined control period during the automated driving of the vehicle M1.

When the routine shown in FIG. 8 is started, the second controller 22 acquires the driving environment information 240 from the second information acquisition device 24 in step S110. The acquired information is stored in the second memory device 224.

Next, in step S112, the second controller 22 detects the avoidance target based on the driving environment information 240. Next, in step S114, the second controller 22 determines whether the operating condition of the preventive safety control for the avoidance target is satisfied. Here, for example, the operating condition is that a TTC (Time To Collision) from the vehicle M1 to the avoidance target is smaller than a predetermined threshold value. As a result, when the operating condition is not satisfied, the processing of this routine is terminated. On the other hand, when the operating condition is satisfied, the second controller 22 calculates the intervention travel control amount for avoiding a collision to the avoidance target, in step S116. The calculated intervention travel control amount is output to the motion control function part 30.

Basically, the motion control function part 30 calculates the travel control amount of the vehicle M1 such that the vehicle M1 follows the target trajectory. However, when the intervention travel control amount is input from the preventive safety function part 40, the motion control function part 30 corrects the travel control amount based on the intervention travel control amount input from the preventive safety function part 40. Typically, when the intervention travel control amount is input from the preventive safety function part 40, the motion control function part 30 outputs the intervention travel control amount as the final travel control amount.

1-8. Specifically Processing of Intervention Degree Change Control

The second controller 22 of the present embodiment changes the intervention degree based on the automated driving information in the preventive safety control during the automated driving.

Figure 9:
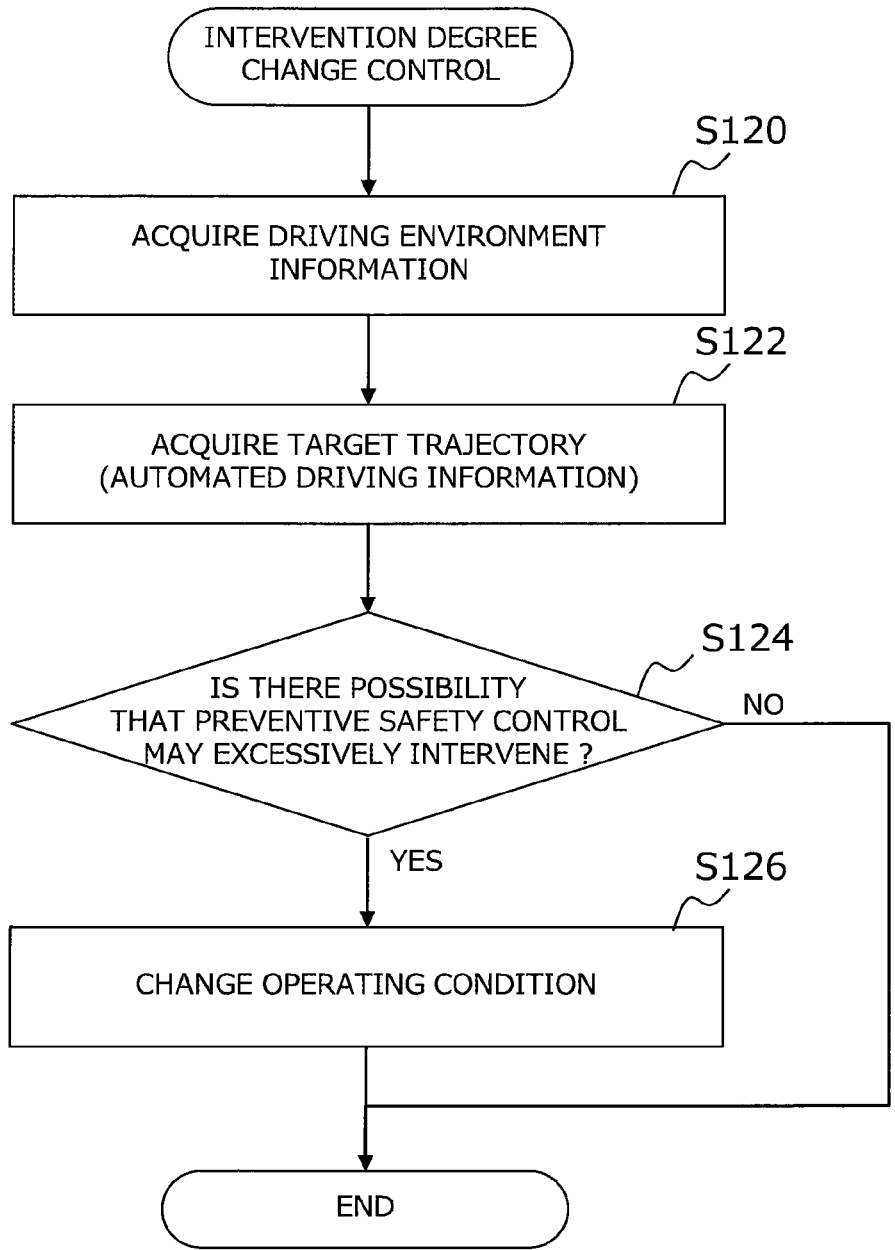
FIG. 9 is a flowchart showing a control routine of an intervention degree change control executed in the second controller according to the first embodiment.

FIG. 9 is a flowchart showing a control routine of the intervention degree change control executed by the second controller 22. The second controller 22 repeatedly executes the routine shown in FIG. 9 at a predetermined control period during the automated driving of the vehicle M1.

When the routine shown in FIG. 9 is started, the second controller 22 acquires the driving environment information 240 (the vehicle information and the surrounding situation information) from the second information acquisition device 24, in step S120. The acquired information is stored in the second memory device 224. Next, in step S122, the second controller 22 acquires the driving involvement degree from the first unit 10. The automated driving information here is a target trajectory. The acquired automated driving information is stored in the second memory device 224.

Next, in step S124, based on the driving environment information 240, the second controller 22 determines whether there is a possibility that the preventive safety control may excessively intervene in the travel control amount calculated from the target trajectory. Here, in the first example, it is determined whether the target trajectory is for passing a preceding vehicle. In the second example, it is determined whether the target trajectory is a trajectory for moving the vehicle M1 to a shoulder for unloading, getting on and off the passenger, or the like. As a result, when the determination is not satisfied, it can be determined that the operating condition of the preventive safety control does not need to be changed. In this case, the second controller 22 ends the control routine without changing the operating condition.

On the other hand, when the determination of S124 of steps is confirmed, it can be determined that there is a possibility of excessive operating of the preventive safety control. In this instance, the process proceeds to next step S126, in which the operating condition of the preventive safety control is changed. Here, when the target trajectory is for passing the preceding vehicle, the second controller 22 changes the operating condition so that the operation timing of the preventive safety control is slower than the timing at which the vehicle M1 straddles the lane. When the target trajectory is a trajectory that moves the vehicle M1 to the shoulder of the road, the second controller 22 changes the threshold of the TTC (Time to collision) the person or the structure on the road side so that the operation timing of the preventive safety control for the person or the structure on the road side is delayed.

As described above, according to the vehicle control system 100 of the first embodiment, it is possible to determine whether the operating condition of the preventive safety control should be changed by using the target trajectory sent from the first unit 10. As a result, excessive intervention of the preventive safety control is suppressed, so that a sense of discomfort or anxiety of the occupant or the surrounding people is suppressed.

1-9. Modified Example

The vehicle control system 100 according to the first embodiment may be applied with a configuration modified as described below.

The preventive safety function part 40 may have a function of calculating a target trajectory instead of a function of calculating an intervention travel control amount. The target trajectory calculated by the preventive safety function part 40 is hereinafter referred to as an "intervention target trajectory". In this case, the calculated intervention target trajectory is output to the motion control function part 30. When the intervention target trajectory is input from the preventive safety function part 40, the motion control function part 30 may calculate the travel control amount based on the intervention target trajectory. This modified example can also be applied to the vehicle control system 100 of another embodiment described later.

Figure 10:
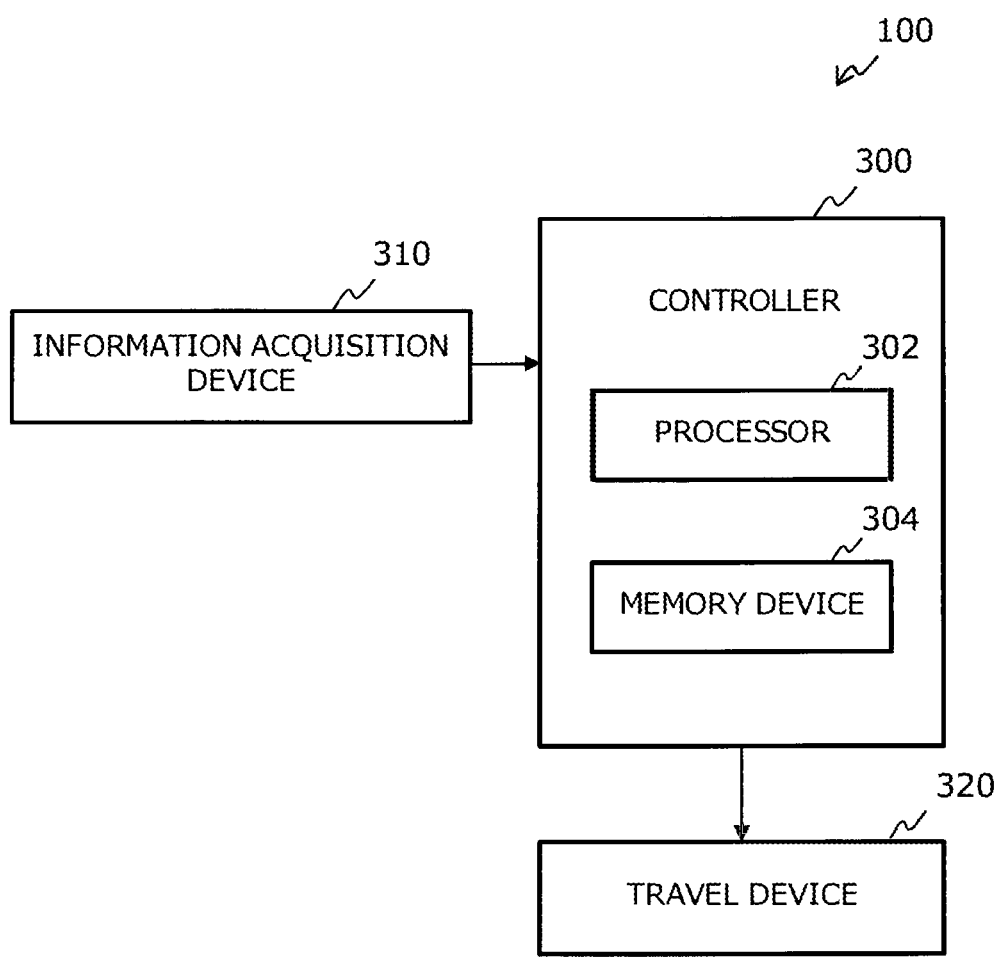
FIG. 10 is a diagram showing a modification of the configuration of the vehicle control system according to the first embodiment.

The first controller 12 and the second controller 22 may be configured as a single common controller. FIG. 10 is a diagram showing a modification of the configuration of the vehicle control system according to the present embodiment. The vehicle control system 100 includes a controller 300, an information acquisition device 310, and a travel device 320. The information acquisition device 310 includes the same functions as the first information acquisition device 14 and the second information acquisition device 24. The travel device 320 includes the same function as the travel device 26.

The controller 300 includes both functions as the first controller 12 of the first unit 10 and a function as the second controller 22 of the second unit 20. The controller 300 includes a processor 302 and a memory device 304. The processor 302 executes the automated driving control software and the vehicle driving control software, which are computer programs. Each software is stored in the memory device 304. Alternatively, each software is recorded on a computer readable recording medium. That is, in the modification of the vehicle control system 100 shown in FIG. 10, the functions of the first controller 12 and the second controller 22 are realized by the processor 302 executing these software. This modified example can also be applied to the vehicle control system 100 of another embodiment described later.

The method of changing the intervention degree in the intervention degree change control is not limited. That is, the second controller 22 is not limited to changing the operation threshold value of the preventive safety control and changing the operation timing, and may be configured to change the intervention degree by changing the operation amount by the preventive safety control.

The first unit 10 and the second unit 20 may be separately designed and developed. For example, the second unit 20 responsible for vehicle travel control is designed and developed by a developer (typically an automobile manufacturer) familiar with the mechanics and vehicle motion characteristics. In this case, reliability of the preventive safety function part 40 of the second unit 20 is extremely high. On the premise of utilizing the high-reliability preventive safety function part 40, an automated driving service provider can design and develop software for the first unit 10. In that sense, it can be said that the second unit 20 is a platform for automated driving services.

2. Second Embodiment

Next, the vehicle control system of the second embodiment will be described.

2-1. Configuration of Vehicle Control System According to Second Embodiment

Configuration of a vehicle control system according to second embodiment is the same as the vehicle control system 100 of the first embodiment. Therefore, a detailed description of the vehicle control system according to the second embodiment is omitted.

2-2. Functions of Vehicle Control System According to Second Embodiment

In the vehicle control system 100 according to the second embodiment is characterized in that a reliability of the first unit 10 is used as the automated driving information output from the first unit 10. The reliability here is, for example, a recognition state of the sensors included in the first unit 10. As the recognition state of the sensors, a detection duration time of the target or the runway recognized by the sensors, a high and low contrast such as blurring of the white line, a strong and weak reflection intensity of the radar, a high and low receiving sensitivity of the GPS, and the like are exemplified.

The first information acquisition device 14 of the first unit 10 includes a surrounding situation sensor 141. Sensors that may be used as the surrounding situation sensor 141 include cameras, radars, riders, sonars, and the like. As the number of types of sensors included in the surrounding situation sensor 141 increases, the recognition state of the sensor increases, so that the reliability increases. In addition, as the number of sensors of the same type included in the surrounding situation sensor 141 increases, the recognition state of the sensor increases, so that the reliability increases. For example, when the surrounding situation sensor 141 includes a plurality of cameras for imaging front, rear, left, and right directions of the vehicle M1, the reliability is increased because the recognition state by the camera is increased. Further, the higher the performance (viewing angle, resolution, effective range, spatial resolution, etc.) of each sensor included in the surrounding situation sensor 141, the higher the reliability.

In addition, the reliability also depends on a shape of the road on which the vehicle M1 travels and the situation around the vehicle M1. As the shape of such a road, for example, the type of the curve and the straight portion, the curvature of the curve, the intersection, the position of the merging point and the branching point, etc. are exemplified. Examples of the surrounding situation of the vehicle M1 include whether or not the vehicle M1 is within an intersection, whether or not the vehicle M1 is in front of a station, and the like. That is, for example, when the vehicle M1 travels on a curve, the recognition state of the various sensors included in the surrounding situation sensor 141 as compared with the case where the vehicle M1 travels on the straight portion may be low reliability. In addition, it is considered that there are a large number of pedestrians and vehicles in front of a station. Therefore, when the vehicle M1 is in front of the station, the recognition state of the various sensors included in the surrounding situation sensor 141 becomes lower than when the vehicle M1 is not in front of the station. As a result, the reliability becomes low.

The reliability is calculated in advance using a predetermined map or the like. Alternatively, the reliability may be calculated in real time based on the state of each sensor included in the surrounding situation sensor 141. The reliability may be a numerical value or a rank.

Further, the reliability may be stored at a position on the map where the vehicle M1 travels when the vehicle M1 actually travels in association with the reliability calculated at that time. In this case, when the vehicle M1 travels at the position again, the reliability associated with the position may be calculated as the present reliability.

In the vehicle control system 100 of the present embodiment, as the automated driving information, the reliability of the first unit 10 is utilized. In the preventive safety control during the automated driving, the second controller 22 performs the intervention degree change control for changing the intervention degree based on the reliability of the first unit 10.

For example, when the reliability is high, the second controller 22 changes the intervention degree to a high level. As an example of this, a situation is considered in which the vehicle M1 approaches the preceding vehicle when the reliability of the first unit 10 is high. It is considered that the first unit 10 generates the target trajectory so as to secure a sufficient inter-vehicular distance with respect to the preceding vehicle because the recognition states of the various sensors are high. In this case, the second controller 22 changes the intervention degree to be higher so that the preventive safety control is activated when the sufficient inter-vehicular distance is interrupted, that is, so that the preventive safety control is easily activated.

In another example, the second controller 22 changes the intervention degree to a low level when the reliability is low. As an example, consider a situation where the vehicle M1 performs a lane change and overtakes the preceding vehicle when the reliability of the first unit 10 is low. Since the first unit 10 is in a state in which the recognition state of the various sensors is low, it is conceivable to actually perform a lane change at a timing slower than the target trajectory. In this case, the second controller 22 changes the intervention degree to a lower direction so that the preventive safety control is difficult to operate when the lane change is performed at the above-mentioned late timing.

Further, in another example, the second controller 22 changes the intervention degree to a low level when the reliability is high. If the reliability of the first unit 10 is high, since the recognition state of the various sensors is in a high state, it is highly likely that the vehicle M1 will accurately follow the target trajectory. In the preventive safety control, it can be said that if the vehicle M1 is also set operating condition on the assumption that the vehicle M1 deviates from the target trajectory, there is room to loosen the operating condition when the tracking accuracy of the target trajectory is high. Therefore, in such a case, the second controller 22 changes the intervention degree in the direction of decreasing the intervention degree. As a result, the second controller 22 suppresses excessive intervention.

As described above, according to the vehicle control system 100 of the second embodiment, it is possible to optimize the intervention degree of the preventive safety control based on the reliability of the first unit 10.

2-3. Specifically Processing of Intervention Degree Change Control

In the vehicle control system 100 of the present embodiment, as the automated driving information, the reliability of the first unit 10 is utilized. In the preventive safety control during the automated driving, the second controller 22 of the present embodiment changes the intervention degree based on the reliability of the first unit 10.

Figure 11:
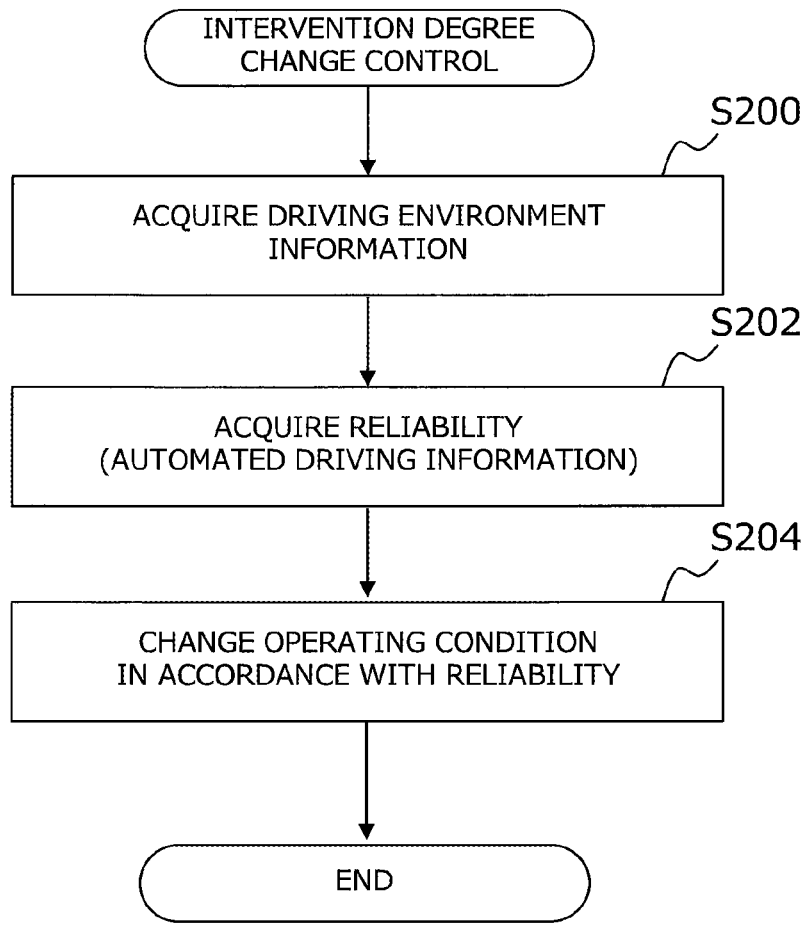
FIG. 11 is a flowchart showing a control routine of the intervention degree change control executed in the second controller according to second embodiment.

FIG. 11 is a flowchart showing a control routine of the intervention degree change control executed by the second controller 22 according to the second embodiment. The second controller 22 repeatedly executes the routine shown in FIG. 11 at a predetermined control period during the automated driving of the vehicle M1.

When the routine shown in FIG. 11 is started, the second controller 22 acquires the driving environment information 240 (the vehicle information and the surrounding situation information) from the second information acquisition device 24, in step S200. The acquired information is stored in the second memory device 224. Next, in step S202, the second controller 22 acquires the automated driving information from the first unit 10. The automated driving information here is the reliability of the first unit 10. The acquired automated driving information is stored in the second memory device 224.

Next, in step S204, the second controller 22 changes the operating condition of the preventive safety control in accordance with the reliability. Here, the operating condition of the preventive safety control for the avoidance target recognized based on the driving environment information 240 is changed.

As described above, according to the vehicle control system 100 of the second embodiment, it is possible to determine whether the operating condition of the preventive safety control should be changed by using the reliability of the first unit 10 sent from the first unit 10. As a result, excessive intervention of preventive safety control is suppressed, so that a sense of discomfort or anxiety of the occupant or the surrounding people is suppressed.

3. Third Embodiment

Next, the vehicle control system according to the third embodiment will be described.

3-1. Configuration of Vehicle Control System According to Third Embodiment

Configuration of a vehicle control system according to third embodiment is the same as the vehicle control system 100 of the first embodiment. Therefore, a detailed description of the vehicle control system according to the third embodiment is omitted.

3-2. Functions of Vehicle Control System According to Third Embodiment

In the vehicle control system 100 according to the second embodiment is characterized in that a failure degree of the first unit 10 is used as the automated driving information output from the first unit 10. The failure degree here is exemplified by, for example, a presence or absence of a hardware failure of a sensor or the like included in the first unit 10, a failure of an ECU, a communication abnormality, and the like. The determination of the presence or absence of such abnormality can be realized by, for example, a known failure diagnosis function.

The first information acquisition device 14 of the first unit 10 includes a surrounding situation sensor 141. Sensors that may be used as the surrounding situation sensor 141 include cameras, radars, riders, sonars, and the like. For example, the more hard failures of the sensors included in the surrounding situation sensor 141, the higher the failure degree. The failure degree may be a numerical value or a rank.

In the vehicle control system 100 of the present embodiment, as the automated driving information, the failure degree of the first unit 10 is utilized. In the preventive safety control during the automated driving, the second controller 22 performs the intervention degree change control for changing the intervention degree based on the failure degree of the first unit 10.

When the failure degree of the first unit 10 is high, the second controller 22 changes the intervention degree to a high degree. For example, when the failure of the first unit 10 is a failure of the surrounding situation sensor 141, the second controller 22 changes the intervention degree of the preventive safety control with respect to the sensing direction of the failed sensor in a direction to increase, but does not change the intervention degree of the preventive safety control with respect to the sensing direction of the normal sensor.

In another example, in the case where the failure degree of the first unit 10 is high, when the failure is a failure of the ECU 12, the intervention degree of the preventive safety control in all directions is changed to be high.

According to the vehicle control system 100 of the third embodiment, it is possible to optimize the intervention degree of the preventive safety control based on the failure degree of the first unit 10.

3-3. Specifically Processing of Intervention Degree Change Control

In the vehicle control system 100 of the present embodiment, as the automated driving information, the failure degree of the first unit 10 is utilized. In the preventive safety control during the automated driving, the second controller 22 of the present embodiment changes the intervention degree based on the failure degree of the first unit 10.

Figure 12:
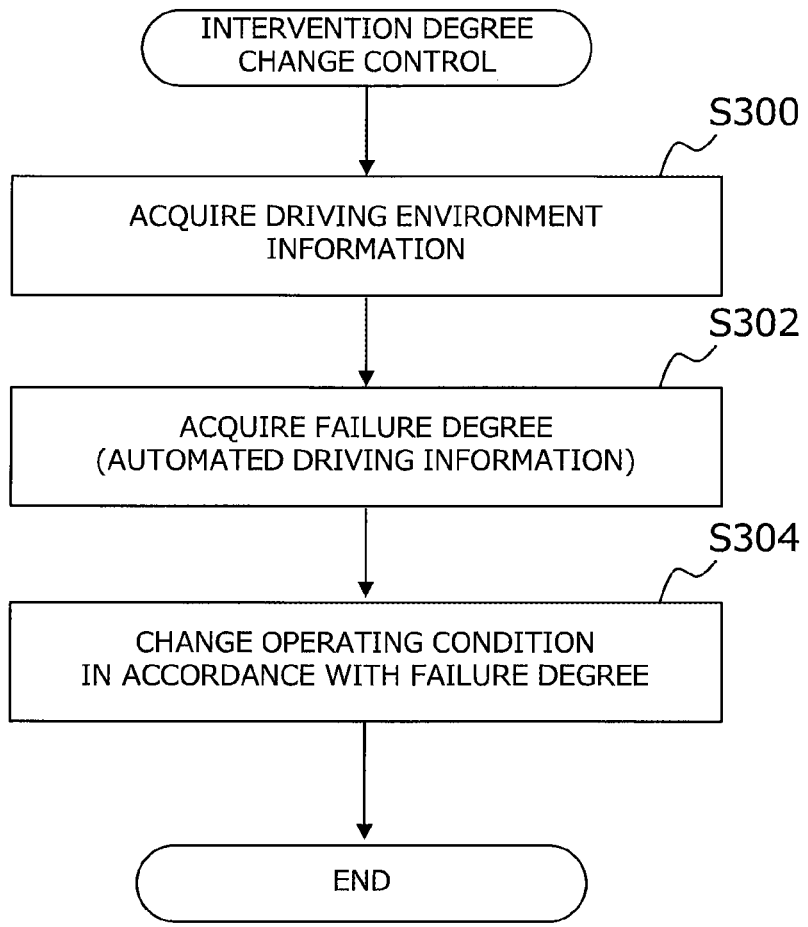
FIG. 12 is a flowchart showing a control routine of the intervention degree change control executed in the second controller according to third embodiment.

FIG. 12 is a flowchart showing a control routine of the intervention degree change control executed by the second controller 22 according to the third embodiment. The second controller 22 repeatedly executes the routine shown in FIG. 12 at a predetermined control period during the automated driving of the vehicle M1.

When the routine shown in FIG. 12 is started, the second controller 22 acquires the driving environment information 240 (the vehicle information and the surrounding situation information) from the second information acquisition device 24, in step S300. The acquired information is stored in the second memory device 224. Next, in step S302, the second controller 22 acquires the automated driving information from the first unit 10. The automated driving information here is the failure degree of the first unit 10. The acquired automated driving information is stored in the second memory device 224.

Next, in step S304, the second controller 22 changes the operating condition of the preventive safety control in accordance with the failure degree. Here, the operating condition of the preventive safety control for the avoidance target recognized based on the driving environment information 240 is changed.

As described above, according to the vehicle control system 100 of the third embodiment, it is possible to determine whether the operating condition of the preventive safety control should be changed using the failure degree of the first unit 10 sent from the first unit 10. As a result, excessive intervention of preventive safety control is suppressed, so that a sense of discomfort or anxiety of the occupant or the surrounding people is suppressed.

4. Fourth Embodiment

Next, the vehicle control system of the fourth embodiment will be described.

4-1. Configuration of Vehicle Control System According to Fourth Embodiment

Configuration of a vehicle control system according to fourth embodiment is the same as the vehicle control system 100 of the first embodiment. Therefore, a detailed description of the vehicle control system according to the fourth embodiment is omitted.

4-2. Functions of Vehicle Control System According to Fourth Embodiment

The vehicle control system 100 according to the fourth embodiment is characterized in that risk information grasped by the first unit 10 is used as the automated driving information output from the first unit 10. The risk information includes, for example, information (e.g., distance, relative velocity, etc.) on a vehicle, a bicycle, a pedestrian, or a falling object recognized by the first unit 10 as a passing object, a distance and a lateral position when the vehicle M1 approaches the passing object most in the future, and the like. In addition, as the risk information includes, for example, information (e.g., distance, relative speed, and the like) on a vehicle which the first unit 10 recognizes as an oncoming vehicle. The risk information is not limited to the above information. The risk information can adopt a wide range of information that the first unit 10 has in order to perform the automated driving control.

In the vehicle control system 100 of the present embodiment, as the automated driving information, the risk information first unit 10 is grasped is output to the second controller 22. In the preventive safety control during the automated driving, the second controller 22 performs the intervention degree change control for changing the intervention degree based on the risk information grasped by the first unit 10.

The second controller 22 changes the intervention degree based on the risk information grasped by the first unit 10. For example, when the vehicle M1 recognizes the preceding vehicle and generates a travel plan for overtaking the preceding vehicle, the first unit 10 outputs information of the vehicle to be overtaken as the risk information. The second controller 22 that has received the risk information can recognize that the first unit 10 recognizes the overtaking vehicle as a risk. Therefore, the second controller 22 changes the intervention degree with respect to the overtaking vehicle in the direction of decreasing the intervention degree.

In another example, in the situation where the vehicle M1 is different from the oncoming vehicle, the first unit 10 outputs the information of the oncoming vehicle as the risk information. It is also conceivable that there may be considerable proximity depending on the road environment when the vehicle is not in contact with the oncoming vehicle. At this time, the second controller 22 that has received the risk information can recognize that the first unit 10 recognizes the oncoming vehicle as a risk. Therefore, the second controller 22 changes the intervention degree with respect to the oncoming vehicle in the direction of decreasing the intervention degree.

As described above, according to the vehicle control system 100 of the fourth embodiment, since the second controller 22 can grasp the risk grasped by the first unit 10 in advance, excessive intervention of the preventive safety control is suppressed.

4-3. Specifically Processing of Intervention Degree Change Control

In the vehicle control system 100 of the present embodiment, as the automated driving information, risk information grasped by the first unit 10 is utilized. In the preventive safety control during the automated driving, the second controller 22 of the present embodiment changes the intervention degree based on the risk information output from the first unit 10.

Figure 13:
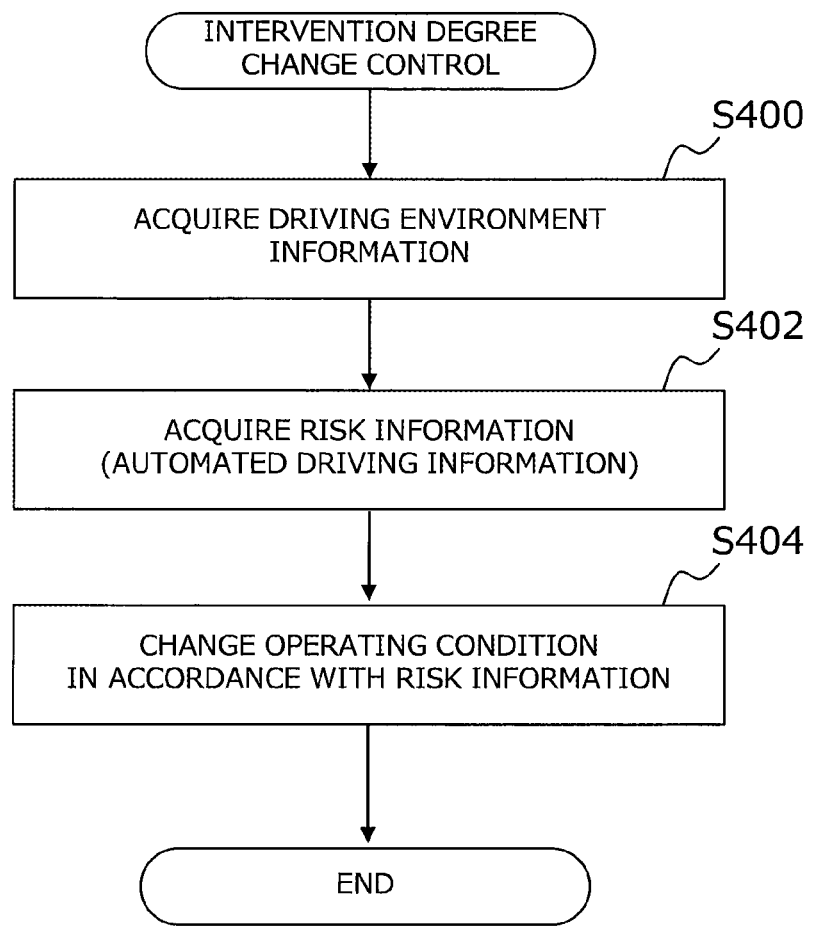
FIG. 13 is a flowchart showing a control routine of the intervention degree change control executed in the second controller according to fourth embodiment.

FIG. 13 is a flowchart showing a control routine of the intervention degree change control executed by the second controller 22 of the fourth embodiment. The second controller 22 repeatedly executes the routine shown in FIG. 13 at a predetermined control period during the automated driving of the vehicle M1.

When the routine shown in FIG. 13 is started, the second controller 22 acquires the driving environment information 240 (the vehicle information and the surrounding situation information) from the second information acquisition device 24, in step S400. The acquired information is stored in the second memory device 224. Next, in step S402, the second controller 22 acquires the automated driving information from the first unit 10. The automated driving information here is risk information grasped by the first unit 10. The acquired automated driving information is stored in the second memory device 224.

Next, in step S404, the second controller 22 changes the operating condition of the preventive safety control in accordance with the risk information. Here, when the risk information includes the information on the avoidance target recognized on the basis of the driving environment information 240, the operating condition of the preventive safety control for the recognized avoidance target is changed to a lower direction.

As described above, according to the vehicle control system 100 of the fourth embodiment, it is possible to determine whether the operating condition of the preventive safety control should be changed based on the risk information that the first unit 10 has grasped transmitted from the first unit 10. As a result, excessive intervention of preventive safety control is suppressed, so that a sense of discomfort or anxiety of the occupant or the surrounding people is suppressed.

What is claimed is:

1. A vehicle control system that controls a vehicle capable of performing automated driving, the vehicle control system comprising:
   an automated driving system comprising a first controller configured to generate a target trajectory based on a travel plan of the vehicle; and
   a vehicle traveling system comprising a second controller configured to execute vehicle travel control that controls steering, acceleration, and deceleration of the vehicle such that the vehicle follows the target trajectory,
   wherein, during the automated driving, the first controller is configured to transmit the target trajectory related to the automated driving to the vehicle traveling system,
   wherein, the second controller includes:
      a memory device in which driving environment information indicating a driving environment around the vehicle is stored; and
      a processor for controlling a travel control amount which is a control amount of the vehicle travel control,
   wherein, during the automated driving, the second controller is configured to:
      detect an avoidance target having a possibility of collision with the vehicle based on the driving environment information; and
      execute preventive safety control by modifying the travel control amount so as to avoid the avoidance target when a predetermined operating condition for the preventive safety control is satisfied, and
   wherein, in the preventive safety control, the second controller is further configured to:
      determine whether the target trajectory is for passing a preceding vehicle or whether the target trajectory is a trajectory for moving the vehicle to a shoulder;
      change the predetermined operating condition so that an operation timing of the preventive safety control is slower than a timing at which the vehicle straddles a lane when the target trajectory is for passing the preceding vehicle; and
      change the predetermined operating condition so that the operation timing of the preventive safety control for the avoidance target is delayed when the target trajectory is a trajectory that moves the vehicle to the shoulder of the road.

* * * * *